United States Patent
Chun et al.

(10) Patent No.: US 9,657,658 B2
(45) Date of Patent: May 23, 2017

(54) METHOD FOR CONTROLLING AIR CONTROL VALVE IN DIESEL HYBRID VEHICLE

(71) Applicant: Hyundai Motor Company, Seoul (KR)

(72) Inventors: Ho-Kyun Chun, Incheon (KR); Hwa-Yong Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 21 days.

(21) Appl. No.: 14/717,521

(22) Filed: May 20, 2015

(65) Prior Publication Data

US 2016/0108831 A1 Apr. 21, 2016

(30) Foreign Application Priority Data

Oct. 21, 2014 (KR) .................. 10-2014-0142669

(51) Int. Cl.
*F02D 41/00* (2006.01)
*B60W 20/17* (2016.01)
*F02D 41/04* (2006.01)

(52) U.S. Cl.
CPC ......... *F02D 41/0005* (2013.01); *B60W 20/17* (2016.01); *F02D 41/042* (2013.01); *B60W 2710/0605* (2013.01); *B60W 2710/0633* (2013.01); *F02D 2041/0022* (2013.01); *Y02T 10/42* (2013.01); *Y10S 903/905* (2013.01)

(58) Field of Classification Search
CPC ............... F02D 41/0005; F02D 41/042; F02D 2041/0022; B60W 20/17; B60W 2710/0633
See application file for complete search history.

(56) References Cited

U.S. PATENT DOCUMENTS

| | | | | |
|---|---|---|---|---|
| 7,383,119 B2* | 6/2008 | Lewis | .................. | F02D 41/042 701/112 |
| 7,559,304 B2* | 7/2009 | Kataoka | ................ | F02D 41/042 123/179.4 |
| 2003/0041831 A1* | 3/2003 | Aoki | ..................... | F02D 41/065 123/179.4 |
| 2006/0030997 A1* | 2/2006 | Ozeki | .................. | F02D 41/042 701/112 |
| 2013/0110383 A1* | 5/2013 | Mc Donald | .......... | F02D 41/042 701/113 |
| 2015/0107555 A1* | 4/2015 | Rai | ....................... | F02D 41/042 123/350 |

FOREIGN PATENT DOCUMENTS

| | | |
|---|---|---|
| JP | 2011-082088 A | 4/2011 |
| JP | 2012-051430 A | 3/2012 |

(Continued)

*Primary Examiner* — Dale W Hilgendorf
(74) *Attorney, Agent, or Firm* — Mintz Levin Cohn Ferris Glovsky and Popeo, P.C.; Peter F. Corless

(57) ABSTRACT

A method for controlling an air control valve in a diesel hybrid vehicle includes an engine stop detection step for detecting whether a diesel engine is stopped and a vehicle speed is less than a predetermined speed, a first noise and vibration blockade step for controlling a throttle valve to be closed when the diesel engine is stopped and the vehicle speed is less than the predetermined speed, and a first throttle valve control step for closing and then opening again the throttle valve for a predetermined time.

13 Claims, 4 Drawing Sheets

(56) References Cited

FOREIGN PATENT DOCUMENTS

| | | |
|---|---|---|
| JP | 2014-156221 A | 8/2014 |
| KR | 10-2004-0045760 A | 6/2004 |
| KR | 10-2005-0025443 A | 3/2005 |
| KR | 10-2007-0052107 A | 5/2007 |
| KR | 2012-0058328 A | 6/2012 |

* cited by examiner

METHOD FOR CONTROLLING AIR CONTROL VALVE IN DIESEL HYBRID VEHICLE

CROSS-REFERENCE(S) TO RELATED APPLICATION(S)

This application claims under 35 U.S.C. §119(a) the benefit of Korean Patent Application No(s). 10-2014-0142669 filed on Oct. 21, 2014, the entire contents of which are incorporated herein by reference.

BACKGROUND (a) Technical Field

The present invention relates to a method for controlling an air control valve in a diesel hybrid vehicle, and more particularly, to a method capable of reducing the noise and vibration associated with a throttle valve in the diesel hybrid vehicle by controlling the throttle valve to be closed and then to be opened again for a predetermined time when a diesel engine is stopped and a vehicle speed is less than a predetermined speed.

(b) Description of the Related Art

Generally, a diesel engine has the advantages of realizing high fuel efficiency and torque compared to a gasoline engine. Also, the diesel engine sucks air and compresses it at high compression ratio and then causes auto-ignition by using a high compression temperature more than 500° C. in the combustion process of fuel, whereas the gasoline engine mixes air and fuel and then ignites it via an electric spark. However, conventional diesel engines have experienced problems including generation of great vibrations and loud noise.

The diesel engine vehicles according to the related art embody an air control valve (ACV) operation logic by detecting whether an ignition is off in order to reduce a travelling vibration.

However, since the situation has been frequently generated in the diesel hybrid vehicles that a motor is operated and the diesel engine is stopped while travelling at low speed, there have been the problems that the vibration/noise is frequently generated due to the air control valve during operation of diesel hybrid vehicles.

SUMMARY

The present invention is directed to a method for controlling an air control valve in a diesel hybrid vehicle capable of reducing the noise and vibration associated with a throttle valve in the diesel hybrid vehicle by controlling the throttle valve to be closed and then to be opened again for a predetermined time when a diesel engine is stopped and a vehicle speed is less than a predetermined speed.

A first exemplary embodiment of the method for controlling the air control valve in the diesel hybrid vehicle according to the present invention may include an engine stop detection step for detecting whether a diesel engine is stopped and a vehicle speed is less than a predetermined speed; a first noise and vibration blockade step for controlling a throttle valve to be closed when the diesel engine is stopped and the vehicle speed is less than the predetermined speed; and a first throttle valve control step for closing and then opening again the throttle valve for a predetermined time.

In addition, the engine stop detection step may be executed again in the first noise and vibration blockade step when the diesel engine is not stopped and the vehicle speed is not less than the predetermined speed.

Further, in the first throttle valve control step, the operations of the throttle valve being closed and thereafter opened again may be repeated several times.

Further, after the first throttle valve control step, the engine stop detection step may be executed again.

A second exemplary embodiment of the method for controlling the air control valve in the diesel hybrid vehicle according to the present invention may include an engine stop detection step for detecting whether a diesel engine is stopped and a vehicle speed is less than a predetermined speed; a first noise and vibration blockade step for controlling a throttle valve to be closed when the diesel engine is stopped and the vehicle speed is less than the predetermined speed; a first throttle valve control step for closing and then opening again the throttle valve for a predetermined time; a starting-off detection step for detecting whether a starting device is off; a second noise and vibration blockade step for controlling the throttle valve to be closed when the starting device is off; and a second throttle valve control step for closing and then opening again the throttle valve for the predetermined time.

In addition, the engine stop detection step may be executed again in the first noise and vibration blockade step when the diesel engine is not stopped and the vehicle speed is not less than the predetermined speed.

Further, in the first throttle valve control step, the operations that the throttle valve is closed and thereafter opened again may be repeated several times for a predetermined.

Further, in the starting-off detection step, the engine stop detection step may be executed again when a starting device is not in the off state.

Further, in the second throttle valve control step, the operations of the throttle valve being closed and thereafter opened again may be repeated several times.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the first exemplary embodiment of a method for controlling an air control valve in a diesel hybrid vehicle by the present invention will be described in greater detail with reference to the attached drawings.

Figure 1:
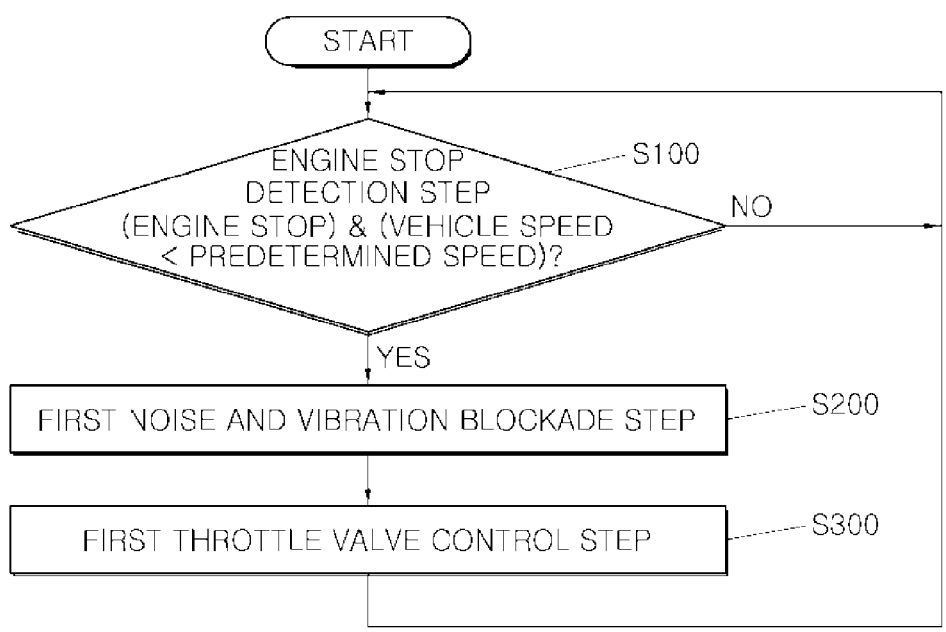
FIG. 1 is a flow chart depicting a first exemplary embodiment of a method for controlling an air control valve in a diesel hybrid vehicle according to the present invention.
Figure 2:
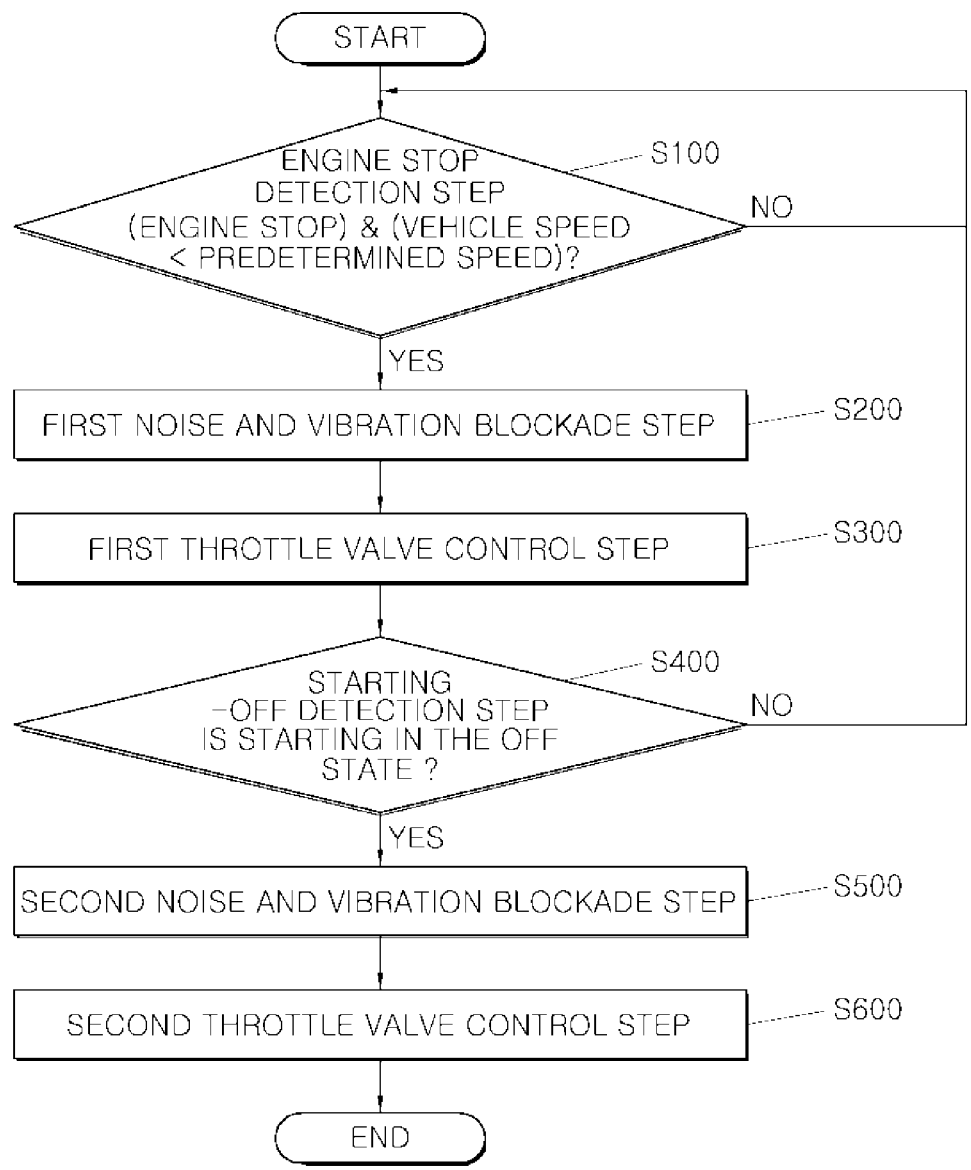
FIG. 2 is a flow chart depicting a second exemplary embodiment of the method for controlling the air control valve in the diesel hybrid vehicle according to the present invention.
Figure 3:
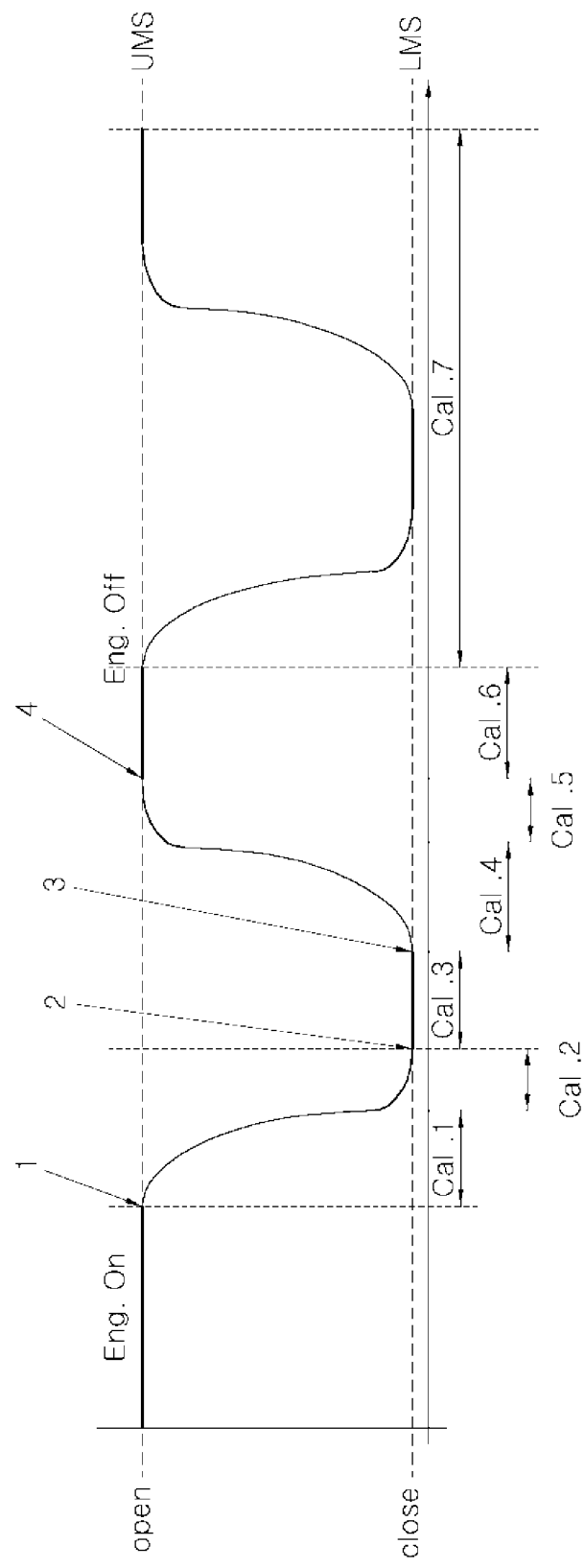
FIG. 3 is a schematic diagram depicting a first throttle valve control step in the exemplary methods for controlling the air control valve in the diesel hybrid vehicle according to the present invention.
Figure 4:
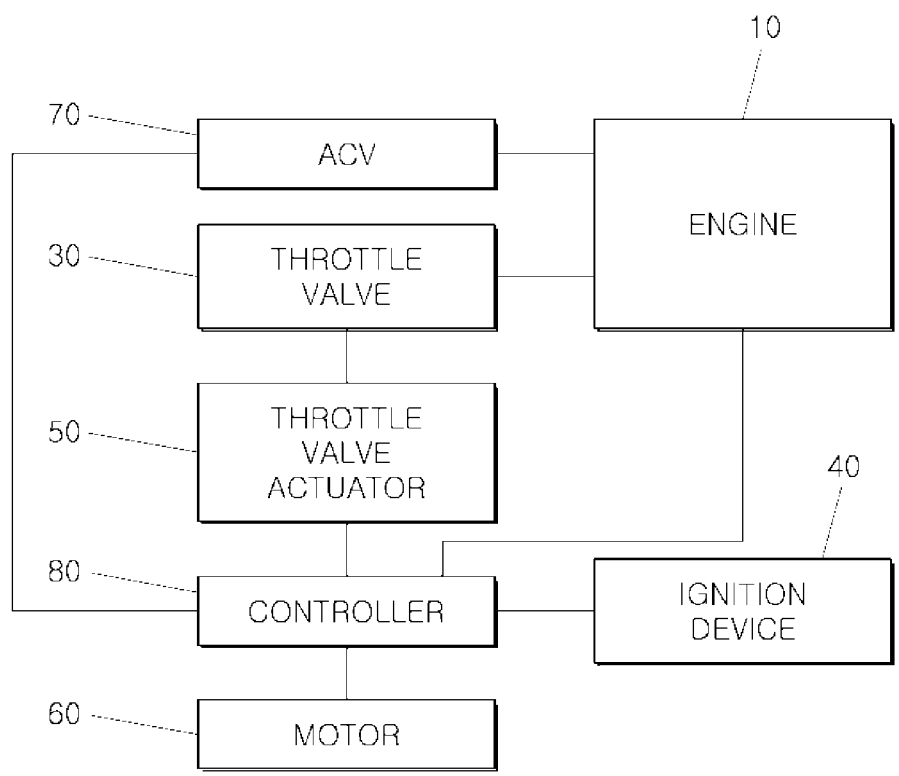
FIG. 4 is a block diagram showing an apparatus for controlling the air control valve in the diesel hybrid vehicle according to the present invention.

FIG. 1 is a flow chart showing the first exemplary embodiment of the method for controlling the air control valve in the diesel hybrid vehicle according to the present invention. FIG. 2 is a flow chart showing the second exemplary embodiment of the method for controlling the air control valve in the diesel hybrid vehicle according to the present invention. FIG. 3 is a schematic diagram showing the first throttle valve control step in the exemplary methods for controlling the air control valve in the diesel hybrid vehicle according to the present invention. FIG. 4 is a block diagram showing an apparatus for controlling the air control valve in the diesel hybrid vehicle according to the present invention.

Referring to FIGS. 1 to 4, the first exemplary embodiment of the method for controlling the air control valve in the diesel hybrid vehicle by the present invention may include an engine stop detection step S100, a first noise and vibration blockade step S200, and a first throttle valve control step S300.

In the engine stop detection step S100, a controller 80 detects whether a diesel engine 10 is stopped and a vehicle speed is less than a predetermined speed. The engine stop detection step S100 is also provided to detect whether the diesel engine 10 is stopped and the vehicle speed is less than the predetermined speed, in order to reduce noise and vibration of the diesel engine 10 by detecting a situation in which the diesel hybrid vehicle is operated by a motor 60 instead of the diesel engine 10. In particular, the opening amount of a throttle valve 30 is controlled in accordance with the vehicle speed in a gasoline vehicle, but the opening amount of the throttle valve 30 is not changed in accordance with the vehicle speed in a diesel hybrid vehicle and the throttle valve 30 maintains its fully opened state when the diesel hybrid vehicle is operated by the diesel engine 10. In this arrangement, the engine stop detection step S100 detects whether the diesel engine 10 is stopped and the vehicle speed is less than the predetermined speed in order to control the throttle valve 30 to be closed. For example, the vehicle speed may be a low vehicle speed of about 0 km/h to 10 km/h, but not be limited to such speeds.

Further, the engine stop detection step S100 may be executed again when the diesel engine 10 is not stopped or the vehicle speed is not less than the predetermined speed. In other words, the engine stop detection step S100 is executed again when the diesel engine 10 is not stopped or the vehicle speed is not less than the predetermined speed such that the conditions for executing the first noise and vibration blockade step S200 may be detected.

In the first noise and vibration blockade step S200, the throttle valve 30 may be controlled to be closed when the diesel engine 10 is stopped and the vehicle speed is less than the predetermined speed. In particular, the first noise and vibration blockade step S200 may control the throttle valve 30 to be closed by detecting the situation where the diesel engine 10 is stopped not to be operated so that the noise and vibration is not generated by the throttle valve 30 or it is not transmitted to a vehicle body and so on through the opened passage of the throttle valve 30. Hence, the noise and vibration by the throttle valve 30 may be just the noise and vibration caused by the operation of an air control valve 70. The air control valve 70 regulates air pressure difference between an intake manifold and an Exhaust Gas Recirculation. Further, the air control valve 70 regulates an exhaust gas uptake rate.

In the first throttle valve control step S300, the throttle valve 30 may be closed and then opened again for a predetermined time. The first throttle valve control step S300 may control the throttle 30 to be closed in order that the noise and vibration by the throttle valve 30 is not generated or the noise and vibration is not transmitted to the vehicle body and so on through the opened passage of the throttle valve 30, and then secure an air intake passage by opening the throttle valve 30 for the diesel engine 10 to be operated. Hence, the predetermined time may be decided through a vehicle test.

In particular, the first throttle valve control step S300 may include a first closure step, a second closure step, a third closure step, a first openness step, a second openness step and a third openness step.

In the first closure step, the throttle valve 30 starts to be closed with the operating velocity of the opened throttle valve 30 increasing. In the second closure step, the throttle valve 30 is operated to be closed with the operating velocity of the opened throttle valve 30 decreasing. In the third closure step, the operation of the throttle valve 30 is stopped so that the throttle valve 30 is closed. In the first openness step, the closed throttle valve 30 starts to be opened with the operating velocity of the closed throttle valve 30 increasing. In the second openness step, the throttle valve 30 is operated to be opened with the operating velocity of the throttle valve 30 decreasing. In the third openness step, the operation of the throttle valve 30 is stopped so that the throttle valve 30 is opened. At this case, when the first closure step is converted to the second closure step, the operating velocity of the throttle valve 30 may be controlled in order that a velocity inflection point interval, at which the operating velocity of the throttle valve 30 increases and thereafter decreases, may be formed. Further, when the first openness step is converted to the second openness step, the operating velocity of the throttle valve 30 may be controlled in order that a velocity inflection point interval, at which the operating velocity of the throttle valve 30 increases and thereafter decreases, may be formed.

Referring to FIG. 3, in the state that the initial throttle valve 30 is opened, when the conditions that the diesel engine 10 is stopped and the vehicle speed is less than the predetermined speed are satisfied, the closure control of the throttle valve 30 starts at point (1). Cal. 1 is a calibration value corresponding to the Open→Close direction of the throttle valve 30. Thereafter, the operating velocity of a throttle valve actuator 50 may be changed in order for the throttle valve 30 to be closed without breakage. Also, the operating time of the throttle valve actuator 50 may be changed in order for the throttle valve 30 to be closed without breakage at point (2). Cal. 2 is a calibration value for soft landing after Cal. 1. When the throttle valve 30 is closed so that noise and vibration is not generated, the throttle valve 30 starts to be opened at point (3). Cal. 3 is a calibration value for reducing the vibration after the soft landing. After that, when the conditions that the diesel engine 10 is stopped and the vehicle speed is less than a predetermined speed are satisfied, the closure control of the throttle valve 30 starts at point (3). After that, the operating velocity of the throttle valve actuator may be changed in order for the throttle valve 30 to be closed without breakage (Soft Landing). Cal. 4-Cal. 6 are calibration values corresponding to the Close→Open direction of the throttle valve 30. Finally, the operating time of the throttle valve actuator may be changed in order for the throttle valve 30 to be opened without breakage at point (4). Hence, the operating time of the throttle valve actuator may be set through vehicle test. Cal. 7 is a calibration value corresponding to the total number of applications of the Open→Close→Open sequence.

In addition, after the first throttle valve control step S300, the engine stop detection step S100 is executed again. In particular, after the first throttle valve control step S300, the engine stop detection step S100 is executed again to detect the conditions that the diesel engine 10 is stopped and the vehicle speed is less than a predetermined speed in order to reduce the noise and vibration caused by the throttle valve 30 or through the throttle valve 30.

Further, in the first throttle valve control step S300, the operations that the throttle valve 30 is closed and then reopened may be repeated several times. As such, the reason for controlling the throttle valve 30 is because the different noise and vibration reducing methods are needed in accordance with the noise and vibration caused by the throttle valve 30 or the noise and vibration kinds through the throttle valve 30 or the characteristics of the throttle valve operation actuator.

Hereinafter, the second exemplary embodiment of a method for controlling the air control valve in the diesel hybrid vehicle by the present invention will be described in detail with reference to the accompanying drawings. FIG. 2 is a flow chart showing the second exemplary embodiment of the method for controlling the air control valve in the diesel hybrid vehicle according to the present invention. In this exemplary embodiment, the steps, which are same to the steps of the first exemplary embodiment of the present invention as previously described, are provided with the same reference numbers shown in FIGS. 1 to 3, and thus the detailed description thereof will be omitted.

Referring to FIG. 2, the second exemplary embodiment of the method for controlling the air control valve in the diesel hybrid vehicle by the present invention may include the engine stop detection step S100, a first noise and vibration blockade step S200, and a first throttle valve control step S300, a starting-off detection step S400, a second noise and vibration blockade step S500 and a second throttle valve control step S600. In particular, the second exemplary embodiment may further include the starting-off detection step S400, the second noise and vibration blockade step S500 and the second throttle valve control step S600, as compared to the first exemplary embodiment of the present invention as previously described.

More particularly, after the throttle valve control step S300, the starting-off detection step S400 detects whether a starting device 40 is off. In particular, the starting-off detection step S400 detects whether an ignition key of the diesel hybrid vehicle is in the off state in order to reduce the noise and vibration cause by the throttle valve 30 or the noise and vibration through the throttle valve 30 when the starting is off. Hence, the noise and vibration caused by the throttle valve 30 may be the noise and vibration caused by the operation of the air control valve (ACV) 70.

In the second noise and vibration blockade step S500, the throttle valve 30 is controlled to be closed when the starting device 40 is off. In particular, the second noise and vibration blockade step S500 controls the throttle valve 30 to be closed in order that the noise and vibration is not generated by the throttle valve 30 or not transmitted to the vehicle body and so on through an opened passage of the throttle valve 30 by detecting the situation that the starting device 40 is off.

In the second throttle valve control step S600, the throttle valve 30 is closed and thereafter reopened for a predetermined time. In particular, in the second throttle valve control step S600, the throttle valve 30 is controlled to be closed in order that the noise and vibration by the throttle valve 30 may not be generated or the noise and vibration may not be transmitted to the vehicle body and so on through the opened passage of the throttle valve 30 and thereafter the throttle valve 30 is reopened in order to secure an air intake passage. Further, in the second throttle vale control step S600, the operations that the throttle valve 30 is closed and thereafter reopened may be repeated several times. As such, the reason for controlling the throttle valve 30 is because the different noise and vibration reducing methods are needed in accordance with the noise and vibration caused by the throttle valve 30 or the noise and vibration kinds through the throttle valve 30 or the characteristics of the throttle valve operation actuator. Hence, the predetermined time may be decided through a vehicle test.

More particularly, the second throttle vale control step S600 may include a fourth closure step, a fifth closure step, a sixth closure step, a fourth openness step, a fifth openness step, a sixth openness step.

In the fourth closure step, the throttle valve 30 starts to be closed with the operating velocity of the opened throttle valve 30 increasing. In the fifth closure step, the throttle valve 30 is operated to be closed with the operating velocity of the throttle valve 30 decreasing. In the sixth closure step, the operation of the throttle valve 30 is stopped so that the throttle valve 30 is closed. In the fourth openness step, the closed throttle valve 30 starts to be opened with the operating velocity of the closed throttle valve 30 increasing. In the fifth openness step, the throttle valve 30 is operated to be opened with the operating velocity of the throttle valve 30 decreasing. In the sixth openness step, the operation of the throttle valve 30 is stopped so that the throttle valve 30 is opened. At this case, when the fourth closure step is converted to the fifth closure step, the operating velocity of the throttle valve 30 may be controlled in order that a velocity inflection point interval, at which the operating velocity of the throttle valve 30 increases and thereafter decreases, may be formed. Further, when the fourth openness step is converted to the fifth openness step, the operating velocity of the throttle valve 30 may be controlled in order that a velocity inflection point interval, at which the operating velocity of the throttle valve 30 increases and thereafter decreases, may be formed.

According to the method for controlling an air control valve in the diesel hybrid vehicle, it is able to reduce the noise and vibration caused by the throttle valve or through the throttle valve during the diesel hybrid vehicle travels or is temporarily stopped.

As described above, within the category of the fundamental technical though of the present invention, many different modifications are possible to person of ordinary skill in the pertinent art and the scope of a right of the present invention should be interpreted based on the accompanying claims.

What is claimed is:

1. A method for reducing noise and vibration associated with a throttle valve in a diesel hybrid vehicle, comprising:
    detecting, by a controller, whether a diesel engine is stopped and a vehicle speed is less than a predetermined speed;
    operating, by the controller, the throttle valve to be closed when the diesel engine is stopped and the vehicle speed is less than the predetermined speed;
    closing and then opening again, by the controller, the throttle valve for a predetermined time;
    detecting, by the controller whether a starting device is off after the throttle valve is closed and then opened again;
    operating, by the controller, the throttle valve to be closed when the starting device is off; and
    closing and then opening again, by the controller, the throttle valve for the predetermined time.

2. The method for reducing noise and vibration associated with the throttle valve in the diesel hybrid vehicle of claim 1, wherein the detection of whether the diesel engine is stopped is repeated after the throttle valve is closed and then opened again.

3. The method for reducing noise and vibration associated with the throttle valve in the diesel hybrid vehicle of claim 1, wherein the detection of whether the diesel engine is stopped is repeated in operation of the throttle valve when the vehicle speed is less than the predetermined speed when the diesel engine is not stopped or the vehicle speed is not less than the predetermined speed.

4. The method for reducing noise and vibration associated with the throttle valve in the diesel hybrid vehicle of claim 1, wherein the operations that the throttle valve is closed and thereafter opened again are repeated several times.

5. The method for reducing noise and vibration associated with the throttle valve in the diesel hybrid vehicle of claim 1, wherein the operation of the throttle valve comprises:
    a first closure in which the throttle valve starts to be closed with the opened throttle valve operation velocity increasing;
    a second closure in which the throttle valve is operated to be closed with the throttle valve operation velocity decreasing;
    a third closure in which the operation of the throttle valve is stopped so that the throttle valve is closed;
    a first openness in which the closed throttle valve starts to be opened with the closed throttle valve operation velocity increasing;
    a second openness in which the throttle valve is operated to be opened with the throttle valve operation velocity decreasing; and
    a third openness in which the operation of the throttle valve is stopped so that the throttle valve is opened.

6. The method for reducing noise and vibration associated with the throttle valve in the diesel hybrid vehicle of claim 5, wherein the throttle valve operation velocity is controlled in order that a velocity inflection point interval, at which the operating velocity of the throttle valve increases and thereafter decreases, may be formed when the switch from the first closure to the second closure is generated.

7. The method for reducing noise and vibration associated with the throttle valve in the diesel hybrid vehicle of claim 5, wherein the throttle valve operation velocity is controlled in order that a velocity inflection point interval, at which the operating velocity of the throttle valve increases and thereafter decreases, may be formed when the switch from the first openness to the second openness is generated.

8. The method for reducing noise and vibration associated with the throttle valve in the diesel hybrid vehicle of claim 1, wherein the detection of whether the diesel engine is stopped is repeated when the starting device is not in the off state.

9. The method for reducing noise and vibration associated with the throttle valve in the diesel hybrid vehicle of claim 1, wherein the operations that the throttle valve is closed and thereafter opened again are repeated several times for a predetermined number of times.

10. The method for reducing noise and vibration associated with the throttle valve in the diesel hybrid vehicle of claim 1, wherein the operation of the throttle valve comprises:
    a fourth closure in which the throttle valve starts to be closed with the opened throttle valve operation velocity increasing;
    a fifth closure in which the throttle valve is operated to be closed with the throttle valve operation velocity decreasing;
    a sixth closure in which the operation of the throttle valve is stopped so that the throttle valve is closed;
    a fourth openness in which the closed throttle valve starts to be opened with the closed throttle valve operation velocity increasing;
    a fifth openness in which the throttle valve is operated to be opened with the throttle valve operation velocity decreasing; and
    a sixth openness in which the operation of the throttle valve is stopped so that the throttle valve is opened.

11. The method for reducing noise and vibration associated with the throttle valve in the diesel hybrid vehicle of claim 10, wherein the throttle valve operation velocity is controlled in order that a velocity inflection point interval, at which the operating velocity of the throttle valve increases and thereafter decreases, may be formed when the switch from the fourth closure to the fifth closure is generated.

12. The method for reducing noise and vibration associated with the throttle valve in the diesel hybrid vehicle of claim 10, wherein the throttle valve operation velocity is controlled in order that a velocity inflection point interval, at which the operating velocity of the throttle valve increases and thereafter decreases, may be formed when the switch from the fourth openness to the fifth openness is generated.

13. A non-transitory computer readable medium containing program instructions executed by a controller, the computer readable medium comprising:
- program instructions that detect, by the controller, whether a diesel engine is stopped and a vehicle speed is less than a predetermined speed;
- program instructions that control, by the controller, a throttle valve to be closed when the diesel engine is stopped and the vehicle speed is less than the predetermined speed;
- program instructions that close and then open again the throttle valve for a predetermined time;
- program instructions that detect whether a starting device is off;
- program instruction that operate the throttle valve to be closed when the starting device is off; and
- program instructions that close and then open again the throttle valve for the predetermined time.

* * * * *